United States Patent
Schmidt

(10) Patent No.: US 7,142,882 B2
(45) Date of Patent: *Nov. 28, 2006

(54) SINGLE CHIP WIRELESS COMMUNICATION INTEGRATED CIRCUIT

(76) Inventor: Dominik J. Schmidt, 580 Arastradero Rd., Palo Alto, CA (US) 94306

( * ) Notice: Subject to any disclaimer, the term of this patent is extended or adjusted under 35 U.S.C. 154(b) by 661 days.

This patent is subject to a terminal disclaimer.

(21) Appl. No.: 09/802,411

(22) Filed: Mar. 9, 2001

(65) Prior Publication Data

US 2002/0128037 A1   Sep. 12, 2002

(51) Int. Cl.
*H04M 1/00*   (2006.01)

(52) U.S. Cl. ............... 455/552.1; 455/41.2; 455/553.1; 709/228; 709/221; 709/230

(58) Field of Classification Search ............. 455/426.1, 455/426.2, 403, 414.2, 118, 553.1, 554.2, 455/557, 102, 103, 132, 41.1, 41.2, 53.1, 455/101, 552.1; 709/228, 221, 230, 311, 709/312

See application file for complete search history.

(56) References Cited

U.S. PATENT DOCUMENTS

| | | | |
|---|---|---|---|
| 4,653,068 A | 3/1987 | Kadin | |
| 5,384,826 A | 1/1995 | Amitay | |
| 5,619,399 A * | 4/1997 | Mok | 361/707 |
| 5,640,399 A | 6/1997 | Rostoker et al. | |
| 5,649,001 A | 7/1997 | Thomas et al. | |
| 5,784,636 A | 7/1998 | Rupp | 712/37 |
| 5,923,702 A | 7/1999 | Brenner et al. | |
| 5,949,775 A | 9/1999 | Rautiola et al. | |
| 5,974,463 A | 10/1999 | Warrier et al. | |
| 6,096,091 A | 8/2000 | Hartmann | 716/17 |
| 6,119,179 A | 9/2000 | Whitridge et al. | |
| 6,181,734 B1 | 1/2001 | Palermo | |
| 6,317,819 B1 | 11/2001 | Morton | 712/22 |
| 6,366,622 B1 * | 4/2002 | Brown et al. | 375/322 |
| 6,400,928 B1 * | 6/2002 | Khullar et al. | 455/67.11 |
| 6,405,027 B1 * | 6/2002 | Bell | 455/403 |
| 6,441,442 B1 * | 8/2002 | Wong | 257/371 |
| 6,603,915 B1 * | 8/2003 | Glebov et al. | 385/129 |
| 6,631,259 B1 * | 10/2003 | Pecen et al. | 370/314 |
| 6,763,444 B1 | 7/2004 | Thomann et al. | 711/170 |
| 7,031,668 B1 | 4/2006 | Darabi et al. | 455/75 |
| 2001/0034227 A1 | 10/2001 | Subramanian et al. | 455/419 |
| 2002/0015401 A1 | 2/2002 | Subramanian et al. | 370/347 |
| 2002/0031166 A1 | 3/2002 | Subramanian et al. | 375/130 |
| 2002/0059434 A1 * | 5/2002 | Karaoguz et al. | 709/228 |
| 2002/0197998 A1 | 12/2002 | Schmidt | 455/452 |

(Continued)

OTHER PUBLICATIONS

Bluetooth FAQ Main Page at ttp://www.bluetooth.com/bluetoothguide/faq/1.asp.

Open Source Baseband Bluetooth Core at http://www.geocities.com/Silicon_Valley/_Pines/6639/ip/bt/baseband.html.

*Primary Examiner*—Matthew D. Anderson
*Assistant Examiner*—Sanh Phu

(57) ABSTRACT

A multi-mode wireless device on a single substrate includes an analog portion and a digital portion integrated on the single substrate. The analog portion includes a cellular radio core; and a short-range wireless transceiver core. The digital portion integrated on the substrate includes a reconfigurable processor core coupled to the cellular radio core and the short-range wireless transceiver core, the reconfigurable processor adapted to handle a plurality of wireless communication protocols. The digital portion also includes a high-density memory array core coupled to the reconfigurable multi-processor core.

20 Claims, 2 Drawing Sheets

U.S. PATENT DOCUMENTS

| | | | |
|---|---|---|---|
| 2003/0035388 A1 | 2/2003 | Schmidt | 370/329 |
| 2003/0058830 A1 | 3/2003 | Schmidt | 370/347 |
| 2003/0067894 A1* | 4/2003 | Schmidt | 370/329 |
| 2004/0243866 A1 | 12/2004 | Sherbune, Jr. | 713/320 |

OTHER PUBLICATIONS

Kneip et al. "Single Chip Programmable Baseband ASSP for 5 GHz Wireless LAN Applications." IEICE Trans. Electron., vol. E85-C, No. 2. Feb. 2002. pp. 359-367.

* cited by examiner

SINGLE CHIP WIRELESS COMMUNICATION INTEGRATED CIRCUIT

BACKGROUND

The present invention relates to a wireless communication device.

Advances in computer technology have provided high performance, miniaturized computers that are inexpensive. Even with these impressive achievements, manufacturers are constantly looking for improvements in areas such as user-friendliness and ease of use. One such area that can be improved is connectivity between devices. At present, peripheral devices are connected to the computer through a myriad of cables and wires. Such cables are unsightly and difficult to manage.

To solve this issue, the Bluetooth™ wireless technology has been developed that provides small-form factor, low-cost, short-range radio links between mobile PCs, mobile phones and other portable devices. The Bluetooth™ technology enables easy synchronization and mobility during a cordless connection, and open up possibilities for establishing quick, temporary (ad-hoc) connections with colleagues, friends, or office networks. Mobility benefits are not offered now by IrDA-enabled (infrared) products, such as some mobile phones, notebook PCs, desktop PCs, and digital cameras. Bluetooth™ technology will enable mobility during a cordless connection, up to 10 meters (30 feet), and up to 100 meters (300 feet) with amplification. Bluetooth™ wireless technology replaces multiple cable connections via a single radio link and creates the possibility of using mobile data in a different way, for different applications to support the fusion of the Internet, mobile telephony, mobile computing, and advanced remote control. Devices using this new technology are easy to use since they can be set to automatically find and contact each other when within range.

Although desirable for replacing cables in connecting appliances together, at present, the Bluetooth™ wireless technology is limited to about 100 meters. Thus, when the user steps outside of the office, he or she no longer has access to the convenience provided by Bluetooth™ wireless technology.

SUMMARY

In one aspect, a multi-mode wireless device on a single substrate includes an analog portion and a digital portion integrated on the single substrate. The analog portion includes a cellular radio core; and a short-range wireless transceiver core. The digital portion integrated on the substrate includes a reconfigurable processor core coupled to the cellular radio core and the short-range wireless transceiver core, the reconfigurable processor adapted to handle a plurality of wireless communication protocols. The digital portion also includes a high-density memory array core coupled to the reconfigurable multi-processor core.

Implementations of the above aspect may include one or more of the following. The wireless device on a single substrate conforms to an IEEE802.11 protocol, Bluetooth™ protocol, a Global System for Mobile Communications (GSM) protocol, a General Packet Radio Service (GPRS) protocol, or an Enhance Data Rates for GSM Evolution (Edge) protocol. The reconfigurable processor core includes one or more digital signal processors (DSPs) and/or one or more reduced instruction set computer (RISC) processors. The wireless device can include a router coupled to the processor, the cellular radio core, and the short-range wireless transceiver core. The router includes an engine that tracks the destinations of packets and send them in parallel through a plurality of separate pathways. The router sends packets in parallel through a primary and a secondary communication channel. For example, in the LAN environment, the data is sent primarily through the LAN channel, and the WAN is only used periodically to ensure a switch can be made if the LAN channel becomes unavailable. Typically, LAN connection time is free, so it is desirable to send data through the LAN and minimize time on the cellular WAN. A data-based WAN like GPRS only charges for actual packets sent, so that maintaining a channel for periodic updates is very inexpensive.

In another aspect, portable computer system with multi-mode wireless access includes a radio 'sniffer' (to determine which protocols are available); a processor; an input recognizer embodied in said program storage device, said input recognizer adapted to receive input from said user; a program storage device coupled to said processor; a computer readable code embodied in said program storage device and coupled to said input recognizer for receiving said user input; and a multi-mode wireless device on a single substrate coupled to the processor. The multimode access device includes an analog portion integrated on the substrate with a cellular radio core; and a short-range wireless transceiver core as well as a digital portion integrated on the substrate with a reconfigurable processor core coupled to the cellular radio core and the short-range wireless transceiver core, the reconfigurable processor adapted to handle a plurality of wireless communication protocols; and a high-density memory array core coupled to the reconfigurable multi-processor core.

Advantages of the system may include one or more of the following. A high performance, low overhead system for wireless communication system expanding the functionality and capabilities of a computer system is provided. The system effectively combines multiple components required to implement cellular radio and Bluetooth™ into a single integrated circuit device. The complete integration of components greatly reduces manufacturing costs. Another benefit is the fact that a single chip solution results in much lower communication overhead, in comparison to prior art multiple chip card system. The system provides for fast, easy migration of existing designs to high performance, high efficiency single chip solutions. Many elements of the LAN and WAN architecture are the same and can be re-used. For example, the Gaussian filter is used both in GSM communication and in Bluetooth communication. Similarly, the MLSE decoder and convolutional decoder are present in almost every wireless protocol, so they can be used without resource duplication.

The system enables easy synchronization and mobility during a cordless connection regardless of distance. The system opens up possibilities for establishing quick, temporary (ad-hoc) connections with colleagues, friends, or office networks. Appliances using the device 100 are easy to use since they can be set to automatically find and contact each other when within range. For example, a user is in his or her office and browses a web site on a portable computer through a wired local area network cable such as an Ethernet cable. Then the user walks to a nearby cubicle. As the user disconnects, the device 100 initiates a short-range connection using a Bluetooth™ connection. When the user drives from his or her office to an off-site meeting, the Bluetooth™ connection is replaced with cellular telephone connection. Further, when the multi-mode wireless communicator device 100 is in the cellular telephone connection mode, the short-range wireless transceiver core 130 is powered down to save power. Unused sections of the chip are also powered down to save power.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
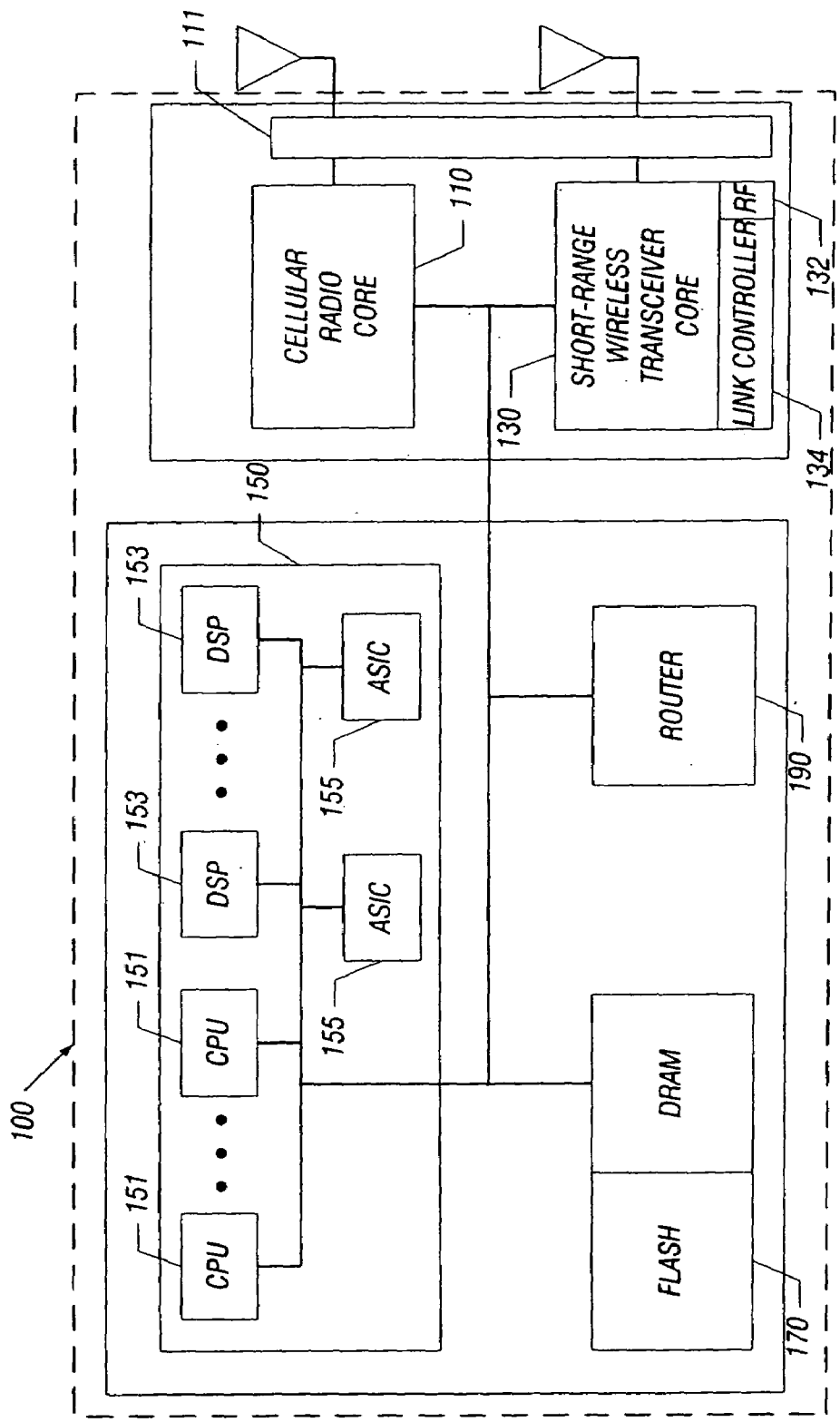
FIG. 1 is a block diagram of a single chip wireless communications integrated circuit.

FIG. 1 shows a block diagram of a multi-mode wireless communicator device 100 fabricated on a single silicon integrated chip. In one implementation, the device 100 is an integrated CMOS device with radio frequency (RF) circuits, including a cellular radio core 110, a short-range wireless transceiver core 130, and a sniffer 111, along side digital circuits, including a reconfigurable processor core 150, a high-density memory array core 170, and a router 190. The high-density memory array core 170 can include various memory technologies such as flash memory and dynamic random access memory (DRAM), among others, on different portions of the memory array core.

The reconfigurable processor core 150 can include one or more processors 151 such as MIPS processors and/or one or more digital signal processors (DSPs) 153, among others. The reconfigurable processor core 150 has a bank of efficient processors 151 and a bank of DSPs 153 with embedded functions. These processors 151 and 153 can be configured to operate optimally on specific problems. For example, the bank of DSPs 153 can be optimized to handle discrete cosine transforms (DCTs) or Viterbi encodings, among others. Additionally, dedicated hardware 155 can be provided to handle specific algorithms in silicon more efficiently than the programmable processors 151 and 153. The number of active processors is controlled depending on the application, so that power is not used when it is not needed. This embodiment does not rely on complex clock control methods to conserve power, since the individual clocks are not run at high speed, but rather the unused processor is simply turned off when not needed.

One exemplary processor embedded in the multi-processor core 150 includes a register bank, a multiplier, a barrel shifter, an arithmetic logic unit (ALU) and a write data register. The exemplary processor can handle DSP functions by having a multiply-accumulate (MAC) unit in parallel with the ALU. Embodiments of the processor can rapidly execute multiply-accumulate (MAC) and add-compare-subtract (ACS) instructions in either scalar or vector mode. Other parts of the exemplary processor include an instruction pipeline, a multiplexer, one or more instruction decoders, and a read data register. A program counter (PC) register addresses the memory system 170. A program counter controller serves to increment the program counter value within the program counter register as each instruction is executed and a new instruction must be fetched for the instruction pipeline. Also, when a branch instruction is executed, the target address of the branch instruction is loaded into the program counter by the program counter controller. The processor core 150 incorporates data pathways between the various functional units. The lines of the data pathways may be synchronously used for writing information into the core 150, or for reading information from the core 150. Strobe lines can be used for this purpose.

In operation, instructions within the instruction pipeline are decoded by one or more of the instruction decoders to produce various core control signals that are passed to the different functional elements of the processor core 150. In response to these core control signals, the different portions of the processor core conduct processing operations, such as multiplication, addition, subtraction and logical operations. The register bank includes a current programming status register (CPSR) and a saved programming status register (SPSR). The current programming status register holds various condition and status flags for the processor core 150. These flags may include processing mode flags (e.g. system mode, user mode, memory abort mode, etc.) as well as flags indicating the occurrence of zero results in arithmetic operations, carries and the like.

Through the router 190, the multi-mode wireless communicator device 100 can detect and communicate with any wireless system it encounters at a given frequency. The router 190 performs the switch in real time through an engine that keeps track of the addresses of where the packets are going. The router 190 can send packets in parallel through two or more separate pathways. For example, if a Bluetooth™ connection is established, the router 190 knows which address it is looking at and will be able to immediately route packets using another connection standard. In doing this operation, the router 190 working with the RF sniffer 111 periodically scans its radio environment ('ping') to decide on optimal transmission medium. The router 190 can send some packets in parallel through both the primary and secondary communication channel to make sure some of the packets arrive at their destinations.

The reconfigurable processor core 150 controls the cellular radio core 110 and the short-range wireless transceiver core 130 to provide a seamless dual-mode network integrated circuit that operates with a plurality of distinct and unrelated communications standards and protocols such as Global System for Mobile Communications (GSM), General Packet Radio Service (GPRS), Enhance Data Rates for GSM Evolution (Edge) and Bluetooth™. The cell phone core 110 provides wide area network (WAN) access, while the short-range wireless transceiver core 130 supports local area network (LAN) access. The reconfigurable processor core 150 has embedded read-only-memory (ROM) containing software such as IEEE802.11, GSM, GPRS, Edge, and/or Bluetooth™ protocol software, among others.

In one embodiment, the cellular radio core 110 includes a transmitter/receiver section that is connected to an off-chip antenna (not shown). The transmitter/receiver section is a direct conversion radio that includes an I/Q demodulator, transmit/receive oscillator/clock generator, multi-band power amplifier (PA) and PA control circuit, and voltage-controlled oscillators and synthesizers. In another embodiment of the transmitter/receiver section, intermediate frequency (IF) stages are used. In this embodiment, during cellular reception, the transmitter/receiver section converts received signals into a first intermediate frequency (IF) by mixing the received signals with a synthesized local oscillator frequency and then translates the first IF signal to a second IF signal. The second IF signal is hard-limited and processed to extract an RSSI signal proportional to the logarithm of the amplitude of the second IF signal. The hard-limited IF signal is processed to extract numerical values related to the instantaneous signal phase, which are then combined with the RSSI signal.

For voice reception, the combined signals are processed by the processor core 150 to form PCM voice samples that are subsequently converted into an analog signal and provided to an external speaker or earphone. For data reception, the processor simply transfers the data over an input/output (I/O) port. During voice transmission, an off-chip microphone captures analog voice signals, digitizes the signal, and provides the digitized signal to the processor core 150. The processor core 150 codes the signal and reduces the bit-rate for transmission. The processor core 150 converts the reduced bit-rate signals to modulated signals such as I, I, Q, Q modulating signals, for example. During data transmission, the data is modulated and the modulated signals are then fed to the cellular telephone transmitter of the transmitter/receiver section.

Turning now to the short-range wireless transceiver core 130, the short-range wireless transceiver core 130 contains a radio frequency (RF) modem core 132 that communicates with a link controller core 134. The processor core 150 controls the link controller core 134. In one embodiment, the RF modem core 132 has a direct-conversion radio architecture with an integrated VCO and frequency synthesizer. The RF-unit 132 includes an RF receiver connected to an analog-digital converter (ADC), which in turn is connected to a modem performing digital modulation, channel filtering, AFC, symbol timing recovery, and bit slicing operations. For transmission, the modem is connected to a digital to analog converter (DAC) that in turn drives an RF transmitter.

The link controller core 134 provides link control function and can be implemented in hardware or in firmware. One embodiment of the core 134 is compliant with the Bluetooth™ specification and processes Bluetooth™ packet types. For header creation, the link controller core 134 performs a header error check, scrambles the header to randomize the data and to minimize DC bias, and performs forward error correction (FEC) encoding to reduce the chances of getting corrupted information. The payload is passed through a cyclic redundancy check (CRC), encrypted/scrambled and FEC-encoded. The FEC encoded data is then inserted into the header.

In one exemplary operating sequence, a user is in his or her office and browses a web site on a portable computer through a wired local area network cable such as an Ethernet cable. Then the user walks to a nearby cubicle. As the user disconnects, the device 100 initiates a short-range connection using a Bluetooth™ connection. When the user drives from his or her office to an off-site meeting, the Bluetooth™ connection is replaced with cellular telephone connection. Thus, the device 100 enables easy synchronization and mobility during a cordless connection, and open up possibilities for establishing quick, temporary (ad-hoc) connections with colleagues, friends, or office networks. Appliances using the device 100 are easy to use since they can be set to automatically find and contact each other when within range.

When the multi-mode wireless communicator device 100 is in the cellular telephone connection mode, the short-range wireless transceiver core 130 is powered down to save power. Unused sections of the chip are also powered down to save power. Many other battery-power saving features are incorporated, and in particular, the cellular radio core 110 when in the standby mode can be powered down for most of the time and only wake up at predetermined instances to read messages transmitted by cellular telephone base stations in the radio's allocated paging time slot.

When the user arrives at the destination, according to one implementation, the cellular radio core 110 uses idle time between its waking periods to activate the short-range wireless transceiver core 130 to search for a Bluetooth™ channel signal. If Bluetooth™ signals are detected, the phone sends a deregistration message to the cellular system and/or a registration message to the Bluetooth™ system. Upon deregistration from the cellular system, the cellular radio core 110 is turned off or put into a deep sleep mode with periodic pinging and the short-range wireless transceiver core 130 and relevant parts of the synthesizer are powered up to listen to the Bluetooth™ channel.

According to one implementation, when the short-range wireless core 130 in the idle mode detects that Bluetooth™ signals have dropped in strength, the device 100 activates the cellular radio core 110 to establish a cellular link, using information from the latest periodic ping. If a cellular connection is established and Bluetooth™ signals are weak, the device 100 sends a deregistration message to the Bluetooth™ system and/or a registration message to the cellular system. Upon registration from the cellular system, the short-range transceiver core 130 is turned off or put into a deep sleep mode and the cellular radio core 110 and relevant parts of the synthesizer are powered up to listen to the cellular channel.

The router 190 can send packets in parallel through the separate pathways of cellular or Bluetooth™. For example, if a Bluetooth™ connection is established, the router 190 knows which address it is looking at and will be able to immediately route packets using another connection standard. In doing this operation, the router 190 pings its environment to decide on optimal transmission medium. If the signal reception is poor for both pathways, the router 190 can send some packets in parallel through both the primary and secondary communication channel (cellular and/or Bluetooth™) to make sure some of the packets arrive at their destinations. However, if the signal strength is adequate, the router 190 prefers the Bluetooth™ mode to minimize the number of subscribers using the capacity-limited and more expensive cellular system at any give time. Only a small percentage of the device 100, those that are temporarily outside the Bluetooth coverage, represents a potential load on the capacity of the cellular system, so that the number of mobile users can be many times greater than the capacity of the cellular system alone could support.

Figure 2:
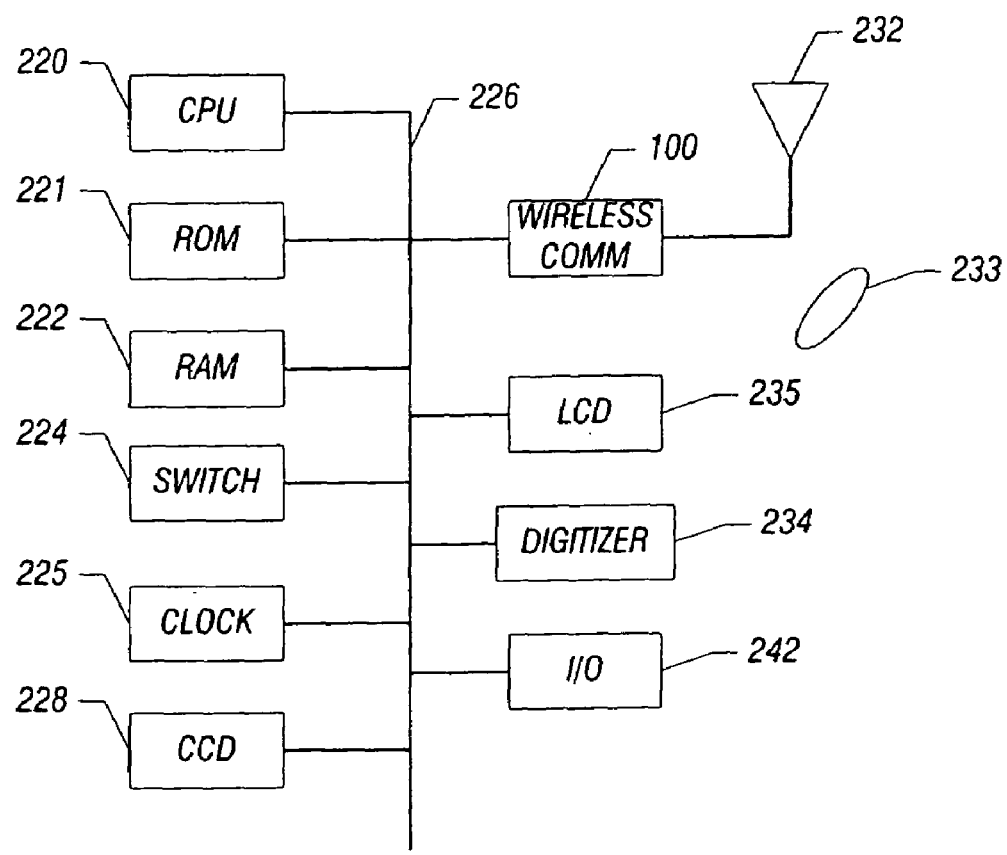
FIG. 2 is a block diagram of a portable computer system for providing data management support in accordance with the present invention.

FIG. 2 illustrates an exemplary computer system 200 with the wireless communication device 100. The computer system 200 is preferably housed in a small, rectangular portable enclosure. Referring now to FIG. 2, a general purpose architecture for entering information into the data management by writing or speaking to the computer system is illustrated. A processor 220 or central processing unit (CPU) provides the processing capability. The processor 220 can be a reduced instruction set computer (RISC) processor or a complex instruction set computer (CISC) processor. In one embodiment, the processor 220 is a low power CPU such as the MC68328V DragonBall device available from Motorola Inc.

The processor 220 is connected to a read-only-memory (ROM) 221 for receiving executable instructions as well as certain predefined data and variables. The processor 220 is also connected to a random access memory (RAM) 222 for storing various run-time variables and data arrays, among others. The RAM 222 is sufficient to store user application programs and data. In this instance, the RAM 222 can be provided with a back-up battery to prevent the loss of data even when the computer system is turned off. However, it is generally desirable to have some type of long term storage such as a commercially available miniature hard disk drive, or non-volatile memory such as a programmable ROM such as an electrically erasable programmable ROM, a flash ROM memory in addition to the ROM 221 for data back-up purposes.

The computer system 200 has built-in applications stored in the ROM 221 or downloadable to the RAM 222 which include, among others, an appointment book to keep track of meetings and to-do lists, a phone book to store phone numbers and other contact information, a notepad for simple word processing applications, a world time clock which shows time around the world and city locations on a map, a database for storing user specific data, a stopwatch with an alarm clock and a countdown timer, a calculator for basic computations and financial computations, and a spreadsheet for more complex data modeling and analysis. Additionally, project planning tools, and CAD/CAM systems, Internet browsers, among others, may be added to increase the functionality of portable computing appliances. Users benefit from this software, as the software allows users to be more productive when they travel as well as when they are in their offices.

The computer system 200 receives instructions from the user via one or more switches such as push-button switches in a keypad 224. The processor 220 is also connected to a real-time clock/timer 225 that tracks time. The clock/timer 225 can be a dedicated integrated circuit for tracking the real-time clock data, or alternatively, the clock/timer 225 can be a software clock where time is tracked based on the clock signal clocking the processor 220. In the event that the clock/timer 225 is software-based, it is preferred that the software clock/timer be interrupt driven to minimize the CPU loading. However, even an interrupt-driven software clock/timer 225 requires certain CPU overhead in tracking time. Thus, the real-time clock/timer integrated circuit 225 is preferable where high processing performance is needed.

The processor 220 drives an internal bus 226. Through the bus 226, the computer system can access data from the ROM 221 or RAM 222, or can acquire I/O information such as visual information via a charged coupled device (CCD) 228. The CCD unit 228 is further connected to a lens assembly (not shown) for receiving and focusing light beams to the CCD for digitization. Images scanned via the CCD unit 228 can be compressed and transmitted via a suitable network such as the Internet, through Bluetooth channel, cellular telephone channels or via facsimile to a remote site.

Additionally, the processor 220 is connected to the multi-mode wireless communicator device 100, which is connected to an antenna 232. The device 100 satisfies the need to access electronic mail, paging, mode/facsimile, remote access to home computers and the Internet. The antenna 232 can be a loop antenna using flat-strip conductors such as printed circuit board wiring traces as flat strip conductors have lower skin effect loss in the rectangular conductor than that of antennas with round-wire conductors. One simple form of wireless communication device 100 is a wireless link to a cellular telephone where the user simply accesses a cellular channel similar to the making of a regular voice call. One channel is reserved for making voice calls. Typically, data channels are not usable for voice communications because of the latency and low packet reliability, so a dedicated voice channel is necessary. In one implementation, GPRS, there are a total of 8 channels per user, one of which is dedicated to voice when the user decides to make a voice call. This voice connection is independent of the data connection.

The processor 220 of the preferred embodiment accepts handwritings as an input medium from the user. A digitizer 234, a pen 233, and a display LCD panel 235 are provided to capture the handwriting. Preferably, the digitizer 234 has a character input region and a numeral input region that are adapted to capture the user's handwritings on words and numbers, respectively. The LCD panel 235 has a viewing screen exposed along one of the planar sides of the enclosure are provided. The assembly combination of the digitizer 234, the pen 233 and the LCD panel 235 serves as an input/output device. When operating as an output device, the screen 235 displays computer-generated images developed by the CPU 220. The LCD panel 235 also provides visual feedback to the user when one or more application software execute. When operating as an input device, the digitizer 234 senses the position of the tip of the stylus or pen 233 on the viewing screen 235 and provides this information to the computer's processor 220. In addition to the vector information, the present invention contemplates that display assemblies capable of sensing the pressure of the stylus on the screen can be used to provide further information to the CPU 220.

The CPU 220 accepts pen strokes from the user using the stylus or pen 233 that is positioned over the digitizer 234. As the user "writes," the position of the pen 233 is sensed by the digitizer 234 via an electromagnetic field as the user writes information to the computer system. The digitizer 234 converts the position information to graphic data. For example, graphical images can be input into the pen-based computer by merely moving the stylus over the surface of the screen. As the CPU 220 senses the position and movement of the stylus, it generates a corresponding image on the screen to create the illusion that the pen or stylus is drawing the image directly upon the screen. The data on the position and movement of the stylus is also provided to handwriting recognition software, which is stored in the ROM 221 and/or the RAM 222. The handwriting recognizer suitably converts the written instructions from the user into text data suitable for saving time and expense information. The process of converting the pen strokes into equivalent characters and/or drawing vectors using the handwriting recognizer is described below.

The computer system is also connected to one or more input/output (I/O) ports 242 which allow the CPU 220 to communicate with other computers. Each of the I/O ports 242 may be a parallel port, a serial port, a universal serial bus (USB) port, a Firewire port, or alternatively a proprietary port to enable the computer system to dock with the host computer. In the event that the I/O port 242 is housed in a docking port, after docking, the I/O ports 242 and software located on a host computer (not shown) support an automatic synchronization of data between the computer system and the host computer. During operation, the synchronization software runs in the background mode on the host computer and listens for a synchronization request or command from the computer system 200 of the present invention. Changes made on the computer system and the host computer will be reflected on both systems after synchronization. Preferably, the synchronization software only synchronizes the portions of the files that have been modified to reduce the updating times. The I/O port 242 is preferably a high speed serial port such as an RS-232 port, a Universal Serial Bus, or a Fibre Channel for cost reasons, but can also be a parallel port for higher data transfer rate.

One or more portable computers 200 can be dispersed in nearby cell regions and communicate with a cellular mobile support station (MSS) as well as a Bluetooth station. The cellular and Bluetooth stations relay the messages via stations positioned on a global basis to ensure that the user is connected to the network, regardless of his or her reference to home. The stations are eventually connected to the Internet, which is a super-network, or a network of networks, interconnecting a number of computers together using predefined protocols to tell the computers how to locate and exchange data with one another. The primary elements of the Internet are host computers that are linked by a backbone telecommunications network and communicate using one or more protocols. The most fundamental of Internet protocols is called Transmission Control Protocol/Internet Protocol (TCP/IP), which is essentially an envelope where data resides. The TCP protocol tells computers what is in the packet, and the IP protocol tells computers where to send the packet. The IP transmits blocks of data called datagrams from sources to destinations throughout the Internet. As packets of information travel across the Internet, routers throughout the network check the addresses of data packages and determine the best route to send them to their destinations. Furthermore, packets of information are detoured around non-operative computers if necessary until the information finds its way to the proper destination.

The Web is based on a client/server model where Web pages reside on host computers that "serve up" pages when the user's computer (client computer) requests them. As the user "surfs" the Web, a browser can request data from the database on a server computer that processes and replies the desired data back to the computer system of FIG. 2 and to display that request when the request is fulfilled by the server. The client computer runs a browser software which asks for specific information by sending a HTTP request across the Internet connection to the host computer. When the host computer receives the HTTP request, it responds by sending the data back to the client.

The browser commonly features a graphical user interface with icons and menus across the top along with a field to supply the URL for retrieval purposes. Navigational buttons guide the users through cyberspace in a linear manner, either one page forward or backward at a time. Pull down menus provide a history of sites accessed so that the user can revisit previous pages. A stop button is typically provided to cancel the loading of a page. To preserve favorite sites, a bookmark is provided to hold the user's favorite URLs in a list such as a directory tree. Furthermore, the browser typically provides a temporary cache on the data storage device or in RAM. The cache allows a more efficient Internet access as it saves bandwidth and improves access performance significantly. The browser also interprets HyperText Markup Language (HTML) which allows web site creators to specify a display format accessible by HTML compatible browsers.

Typically, when the user types in the URL or clicks on a hyperlink, TCP/IP opens a connection between the host and client computers. The browser then generates a request header to ask for a specific HTML document. The server responds by sending the HTML document as text to the client via the TCP/IP pipeline. The client computer acknowledges receipt of the page and the connection is closed. The HTML document is stored in the browser's cache. The browser then parses the HTML document for text and tags. If the browser runs across tags that link to images/pictures and sounds, the browser makes separate requests for these files to the server and displays or generates sounds to the user.

To supply more intelligent processing of information over the Internet, a language such as Java may be utilized. Java was developed originally by Sun Microsystems of Mountain View, Calif. The specification for the Java language is stored at the Java web site http://java.sun.com/. The web site contains the Java development software, a HotJava web browser, and on-line documentation for all aspects of the Java language, hereby incorporated by reference. Designed to be small, simple and portable across processor platforms and operating systems, Java can download and play applets on a browser system of the receiver, or reader. Applets are Java programs that are downloaded over the Internet World Wide Web, as dictated by a tag such as <applet> tags and executed by a Web browser on the reader's machine. In Java, the compiler takes the instructions and generates bytecodes, which are system independent machine codes. A bytecode interpreter executes the bytecodes. The bytecode interpreter can execute stand-alone, or in the case of applets, the bytecode interpreter is built-in Java compatible browsers. Thus, with a Java compatible client-server, the Internet is transformed from a passive giant book of information into an active network capable of supporting electronic commerce and virtual ecosystems. The computer 200 allows users to move about freely within and between cells while transparently maintaining all connections, particularly with the Internet.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. A multi-mode wireless device on a single substrate, comprising:
    an integrated circuit having an analog portion integrated on the substrate, comprising:
        a cellular radio core;
        a radio sniffer coupled to the cellular radio core; and
        a short-range wireless transceiver core coupled to the cellular radio core; and
    the integrated circuit having a digital portion integrated on the substrate, comprising:
        a reconfigurable processor core coupled to the cellular radio core and the short-range wireless transceiver core, the reconfigurable processor core configured to handle a plurality of wireless communication protocols; and a router coupled to the reconfigurable processor core, the cellular radio core, and the short-range wireless transceiver core, the router configured to transmit data packets in parallel simultaneously via the cellular radio core and the short-range wireless transceiver core.

2. The wireless device on a single substrate of claim 1, wherein at least one of the wireless communication protocols conforms to a Bluetooth™ or IEEE802.11 protocol.

3. The wireless device on a single substrate of claim 1, wherein the reconfigurable processor core includes one or more reduced instruction set computer (RISC) processors.

4. The wireless device on a single substrate of claim 1, wherein the router further comprises an engine configured to track the destinations of the data packets.

5. The wireless device on a single substrate of claim 1, wherein the router is configured to send the data packets in parallel through a primary and a secondary communication channel, wherein the primary communication channel comprises a short-range channel and the secondary communication channel comprises a cellular channel.

6. A portable computer system, comprising:
a processor;
a multi-mode wireless integrated circuit formed on a single substrate coupled to the processor, the integrated circuit comprising:
an analog portion integrated on the substrate, including:
a cellular radio core; and
a short-range wireless transceiver core; and
a digital portion integrated on the single substrate, including:
a reconfigurable processor core coupled to the cellular radio core and the short-range wireless transceiver core, the reconfigurable processor core including multiple programmable processors and multiple dedicated processors configured to handle a plurality of wireless communication protocols;
a router coupled to the reconfigurable processor core, the cellular radio core, and the short-range wireless transceiver core, the router configured to transmit data packets in parallel simultaneously via the cellular radio core and the short-range wireless transceiver core; and
a memory array coupled to the reconfigurable processor core;
a program storage device coupled to said processor; and
an input recognizer embodied in said program storage device, said input recognizer configured to receive input from a user.

7. The portable computer system of claim 6, wherein one of the wireless communication protocols conforms to a Bluetooth™ protocol.

8. The portable computer system of claim 6, wherein the multiple programmable processors include one or more digital signal processors (DSPs).

9. The portable computer system of claim 8, wherein the multiple programmable processors include one or more reduced instruction set computer (RISC) processors.

10. The portable computer system of claim 6, wherein the router further comprises an engine configured to track the destinations of the data packets.

11. The portable computer system of claim 6, wherein the router is configured to send the data packets in parallel through a primary and a secondary communication channel.

12. A method comprising:
communicating data packets via a cellular radio medium using a multi-mode wireless integrated circuit having a substrate including a cellular radio core, a short-range wireless transceiver core, and a processor core; and
communicating at least some of the data packets in parallel simultaneously via a short-range wireless medium and a cellular radio medium using the multi-mode wireless integrated circuit.

13. The method of claim 12, further comprising primarily communicating the data packets via a primary communication channel and periodically communicating the data packets via a secondary communication channel.

14. The method of claim 12, further comprising communicating the data packets via the short-range wireless medium while in a local area network and communicating the data packets via the cellular radio medium while outside the local area network.

15. The method of claim 14, further comprising powering down the short-range wireless transceiver core while communicating the data packets via the cellular radio medium.

16. The method of claim 12, further comprising searching for a short-range wireless medium signal during an idle time of the cellular radio core.

17. The method of claim 16, further comprising transmitting a deregistration message to a cellular system if the short-range wireless medium signal is found.

18. The wireless device on a single substrate of claim 1, wherein the router is configured to determine an optimal transmission medium based on information from the radio sniffer.

19. The wireless device on a single substrate of claim 1, wherein the router is configured to reuse a filter and a decoder for the plurality of wireless communication protocols.

20. The portable computer system of claim 6, further comprising a radio sniffer coupled to the cellular radio core and the short-range wireless transceiver core to determine an optimal transmission medium based on information from the radio sniffer.

* * * * *